July 25, 1967

D. L. CRONIN ET AL 3,333,176

SEMI-CONDUCTOR APPARATUS

Filed Feb. 14, 1957

INVENTOR.
DONALD L. CRONIN
JAMES L. JENSEN

BY

*Omund R Dahle*

ATTORNEY

3,333,176
SEMI-CONDUCTOR APPARATUS
Donald L. Cronin, Richfield, and James Lee Jensen, St. Louis Park, Minn., assignors to Honeywell Inc., a corporation of Delaware
Filed Feb. 14, 1957, Ser. No. 640,168
14 Claims. (Cl. 320—39)

This invention relates to new and improved vehicular voltage regulators for use in regulating the output voltage and current of a generator of the type used in military vehicles, trucks, automobiles and the like. More specifically, the invention relates to a transistor vehicular voltage regulator in which a transistor switching circuit is utilized to control the energization of a generator field winding.

It is an object of this invention to provide a new and improved voltage regulator with emphasis toward vehicular use, which regulator is of the transistor type and which has no mechanical vibrating contacts.

It is a further object of this invention to provide an improved vehicular voltage regulator of the transistor type which is effective to control the energization of an AC or a DC generator and which is relatively insensitive to mechanical shock and substantially unaffected by wide variations in ambient temperatures.

Figure 1:
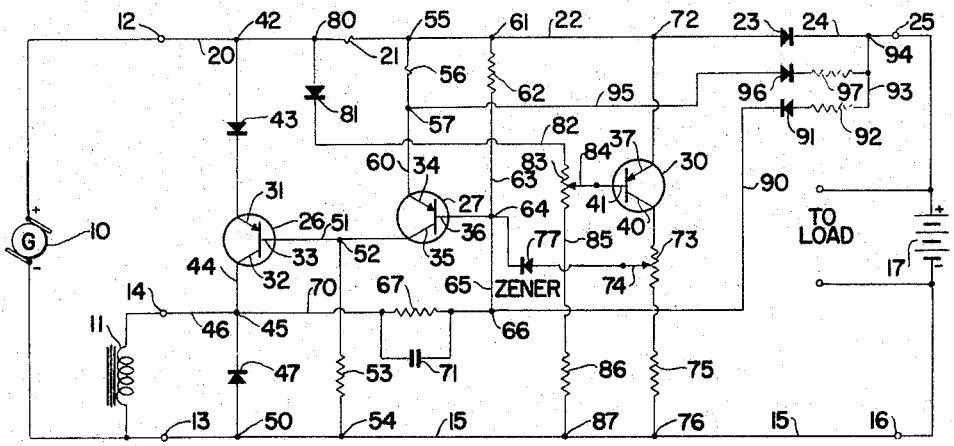
Figure 2:
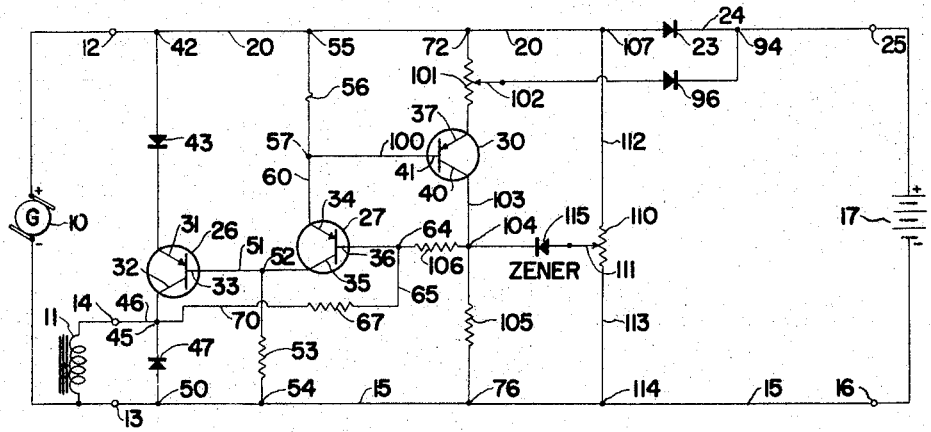
Figure 3:
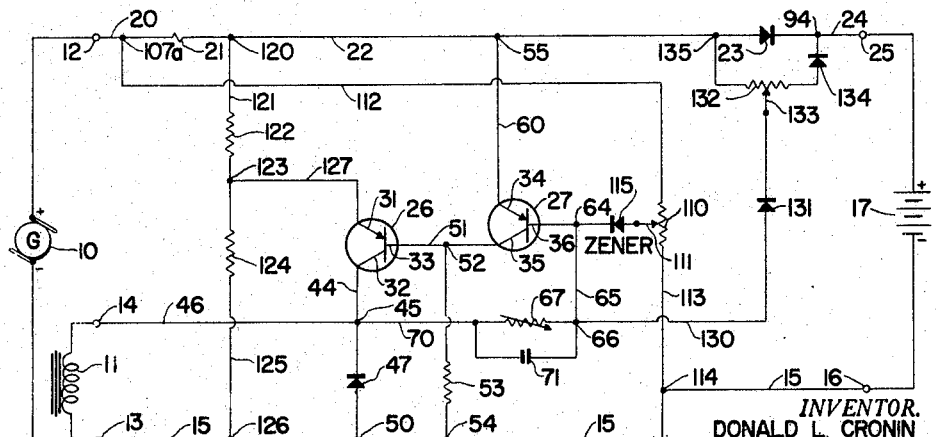

These and other objects of the present invention will be understood upon consideration of the accompanying specification, claims and drawings of which:

FIGURE 1 is a schematic representation of a preferred embodiment of the invention; and FIGURES 2 and 3 are schematic representations of variations of the invention as shown in FIGURE 1.

Referring now to FIGURE 1, there is disclosed an electrical generator 10 which also includes a field or exciting winding or coil 11. The generator as shown is a self-excited DC generator of the type generally used on vehicles for the purpose of recharging batteries, and which is driven by the vehicle engine and which is capable of being operated over widely varying engine speeds, that is, from engine idling speeds to full throttle. The generator to be controlled is not limited to the DC type generator of the type shown but may be any suitable type, for example, an AC generator, the output of which is connected to a rectifier. The generator has a pair of output terminals 12 and 13, the terminal 13 being connected by a conductor 15 to a negative terminal 16 of a battery 17. The generator terminal 12 is connected through a circuit including a conductor 20, a resistor 21 of a relatively small value, a conductor 22, a rectifier 23 of relatively high current carrying capacity, and a conductor 24 to a positive terminal 25 of the battery 17. The rectifier 23 may be of any suitable type, but is preferably a semi-conductor junction diode, the current capacity of which is large enough to carry the generator output current.

The circuit of FIGURE 1 also discloses three transistors 26, 27 and 30 shown as junction PNP transistors for convenience of explanation. The transistor 26 has an emitter electrode 31, a collector electrode 32 and a base electrode 33; the transistor 27 has an emitter electrode 34, a collector electrode 35, and a base electrode 36; and the transistor 30 has an emitter electrode 37, a collector electrode 40, and a base electrode 41. The collector electrode 32 of the transistor 26 is connected by a conductor 44, a junction 45, and a conductor 46 to a terminal 14 of the field winding 11. The other terminal of the field winding is connected to the generator output terminal 13. A rectifier 47, such as a junction diode, for damping transient potentials of winding 11, is connected across the field winding terminals by being connected from a junction 50 on the conductor 15 to the junction 45.

The base electrode 33 of transistor 26 is directly connected by a conductor 51 to the collector electrode 35 of transistor 27. A junction 52 on the conductor 51 is connected by a resistor 53 to a junction 54 on the conductor 15. A junction 55 on the conductor 22 is connected by means of a resistor 56, a junction 57 and a conductor 60 to the emitter electrode 34 of the transistor 27. A junction 61 on the positive conductor 22 is connected by a resistor 62, a conductor 63, and a junction 64 to the base electrode 36 of the transistor 27. The base electrode 36 is further connected by a junction 64, a conductor 65, a junction 66, a resistor 67, and a conductor 70 to the junction 45 which is in the collector circuit of transistor 26. A capacitor 71 is connected in parallel with the resistor 67. The emitter electrode 37 of transistor 30 is directly connected to the conductor 22 at a junction 72. The collector electrode 40 of the transistor 30 is connected by means of a potentiometer resistor 73, which has an adjustable wiper 74, and through a resistor 75 to a junction 76 on the conductor 15. The adjustable tap 74 of potentiometer 73 is connected by a voltage reference element 77, which is shown as a Zener diode, to the junction 64 and thus to the base electrode 36 of transistor 27.

A Zener diode is a semi-conductor junction rectifier poled so that current flows through it in the reverse or high resistance direction. The Zener voltage or Zener point is the voltage across the rectifying junction associated with that portion of the reverse E vs. I characteristic of a semi-conductor junction device wherein the voltage across the junction remains substantially constant over a considerable range of current values.

A bias potential for the base circuit of transistor 30 is provided by a network which commences at a junction 80 on the conductor 20 and flows through a junction diode 81, a conductor 82, a potentiometer resistor 83, which has an adjustable wiper contact 84, through a conductor 85 and a resistor 86 to a junction 87 on the conductor 15. The adjustable wiper 84 of the potentiometer 83 is directly connected to the base electrode 41 of the transistor 30. The base electrode 36 of the transistor 27 is connected by means of the junction 64, the conductor 65, the junction 66, conductor 90, a junction diode rectifier 91, a resistor 92, and a conductor 93 to a junction 94 on the conductor 24 which connects to the positive terminal 25 of the battery 17. The emitter electrode 34 of the transistor 27 is connected by means of the conductor 60, the junction 57, a conductor 95, a junction diode 96, a resistor 97, and through the conductor 93, the junction 94 and the conductor 24 to the positive battery terminal 25.

OPERATION OF FIGURE 1

In considering the operation of the circuit of FIGURE 1, it should be noted that the amount of electrical output from the generator 10 is controlled by the average amount of current flowing in the field winding 11 of the generator. The current flowing in the field winding flows through the switching transistor 26 and is controlled by the state of conduction of the transistor 26. It should be further noted that switching transistor 26 is operative to only two conditions, either current cutoff or current saturation, as will be explained.

Let it be assumed that the generator 10 has just commenced producing an electrical output, the polarity of which is positive at terminal 12 with respect to terminal 13 and that the terminal voltage is increasing but is still below the regulating potential. In this condition of operation the switching transistor 26 is biased fully conductive so that a maximum self-exciting current can flow from the positive output terminal 12 of the generator through the conductor 20, the junction 42, the junction diode 43, through the transistor 26 from emitter 31 to collector electrode 32, conductor 44, junction 45, conductor 46 to the field winding terminal 14 and through the field winding 11 to the negative generator terminal 13. This exciting current may be in the order of one ampere. A base electrode current path can be traced for the transistor 26 commencing at the positive generator terminal 12 and flowing through the conductor 20, the junction 42, the diode 43, from emitter 31 to base electrode 33, conductor 51, junction 52, resistor 53, junction 54, and conductor 15 back to the negative generator terminal 13.

As the terminal voltage of the generator 10 becomes greater than the terminal voltage of the battery 17, to be charged, a charging current flows from the positive generator terminal 12 through the conductor 20, the resistor 21, the conductor 22, the rectifier 23, the conductor 24, junction 25, the battery 17, junction 16, and the conductor 15 back to the negative terminal 13 of the generator. The function of the diode 23 is to prevent a reverse current from flowing into the voltage regulator and generator during periods when the generator terminal voltage is less than the battery potential. Resistor 21 is preferably a small value, for example it may be a fraction of an ohm.

The conduction of the switching transistor 26 is controlled by the conduction of the control transistor 27. At such time as the terminal potential of the generator reaches a predetermined magnitude at which it is desired to regulate, the transistor 27 will become conductive, as will be explained in greater detail below. When control transistor 27 is caused to conduct, a current path may be traced from the positive generator terminal 12 through the conductor 20, the resistor 21, the junction 55, the resistor 56, the conductor 60, from the emitter to collector of transistor 27, conductor 51 to junction 52, through the resistor 53 to junction 54, and through the conductor 15 to the negative generator terminal 13.

With the switching transistor 26 remaining conductive, the exciting current flowing in the field winding 11 causes the generator terminal voltage to rise rapidly, and as the terminal voltage approaches the regulating valve, the transistor 26 is switched off. The voltage magnitude at which regulation takes place is determined by the setting of the wiper contact 74 of voltage setpoint potentiometer 73. At the desired regulating voltage the potential beween the base electrode 36 of transistor 27 and the wiper contact 74 is sufficient to reach the Zener point of the Zener diode 77 whereupon the diode becomes conductive and presents a very low impedance in the circuit. Upon diode 77 becoming conductive, a low impedance path for base current is present for the transistor 27, which path may be traced from the base electrode 36 through the Zener diode 77, wiper 74, the lower portion of potentiometer 73, resistor 75 and to the negative conductor 15 at the junction 76. An increase in the current conduction of transistor 27 results, tending to reduce the current flow of the switching transistor 26. As the conduction of transistor 26 is reduced the potential at the junction 45 in the collector circuit of transistor 26 changes, and a regenerative feedback potential appears through resistor 67 and capacitor 71 to the base electrode 36 of the control transistor 27. This feedback is in a direction to increase the current flow of transistor 27 thereby aiding the switching process until transistor 26 is switched off. With transistor 26 in an off position the energization of the field winding is reduced. The generator terminal voltage now drops, Zener diode 77 conducts less, the conduction of control transistor 27 is reduced, switching transistor 26 begins to conduct, the regenerative feedback circuit cuts transistor 27 off and switching transistor 26 again becomes conductive to repeat the cycle. This oscillatory type action is rapid and continuous.

The actual range over which the output voltage varies will be very small for the Zener diode conducts over a wide current range with extremely small voltage changes and therefore small changes in Zener current initiates the switching process which takes place repeatedly and very rapidly.

The output impedance of the control transistor 27 is very low when the transistor is conductive so that the potential of the collector electrode 35 and thus of the conductor 51 and base electrode 33 of transistor 26 approaches the potential at terminal 12. This is due to the fact that the magnitude of the resistor 53 is relatively large with respect to the combined series resistance of the resistors 21, 56, and the output impedance of transistor 27, so that most of the generator potential appears across the resistor 53. With the potential at the base electrode 33 approaching that of the generator terminal 12, as explained above, the conduction of transistor 26 can be cut off. To further assure that the transistor 26 will be cut off in this condition, the semi-conductor diode 43, which is in series with the emitter electrode 31, presents a very high impedance in the emitter circuit of transistor 26 and as a result thereof the conduction of the transistor 26 is substantially zero.

The junction diode 47 which is in parallel with the field winding 11 is effective to damp the voltage transients which would otherwise result from the rapid switching of the transistor 26 and the inductive action of the winding 11.

A base current path for the control transistor 27 may be traced from the positive generator terminal to the emitter electrode 34, to base electrode 36, junction 64, through the Zener diode 77, to the potentiometer wiper 74 of the voltage setpoint potentiometer 73, through the lower portion of potentiometer 73, and the resistor 75 to the negative conductor 15 and back to the negative generator terminal 13. The Zener diode 77 is chosen to have a reverse voltage characteristic of a predetermined magnitude, so that as the terminal voltage of the generator reaches the point at which it is desired to regulate, the potential existing between the wiper 74 of potentiometer 73 and the base electrode 36 of transistor 27 reaches the Zener point of the diode 77 and the diode becomes conductive. By adjusting the wiper 74 of the potentiometer 73, the terminal voltage at which regulation is commenced can be varied.

Under normal operating conditions, the transistor 30 is continuously conductive and the output impedance thereof is thereby maintained at a relatively low value. A current path may be traced from the positive generator terminal 12 through the conductor 20, the resistor 21, the conductor 22, the junction 72, from emitter to collector of transistor 30, through the potentiometer 73 and the resistor 75, and back through the conductor 15 to the negative generator terminals. It can be seen that the output impedance of the transistor 30 forms a portion of the biasing network of the control transistor 27, that is, if the output impedance of the transistor 30 changes, the potential of the wiper 74 of potentiometer 73 will be changed to vary the regulating point of the voltage regulator. The function of the transistor 30 is to provide current regulation when the output current of the generator reaches a magnitude at which it is desired to limit the generator output. It will be noted that by proper adjustment of the wiper 84 of potentiometer 83, the base electrode 41 of transistor 30 can be made negative with respect to the emitter electrode 37 so that under normal operating conditions, the transistor 30 will remain conductive. As the output current of the generator to the battery 17 or to the load increases, a voltage drop will appear across the resistor 21 which voltage is proportional in magnitude to the current output of the generator. The resistor 21 is preferably a very low value, for example, it may be in the order of .3 ohm. The voltage drop across this resistor is effective to change the potential of the emitter electrode 37 with respect to the base electrode 41 in a direction to tend to cut off the conduction of transistor 30 as the generator output current increases beyond its predetermined maximum value.

In other words, the conduction of the transistor 30 is dependent upon the output current of the generator; an increasing generator current resulting in an increasing potential drop across the current sensing resistor 21, which potential drop is effective to vary the bias across the input electrode of the transistor 30. Let it be assumed that the generator output current has increased to a value which results in a potential drop across the current sensing resistor 21 of a magnitude to bias the transistor 30 toward cut off. As transistor 30 is biased towards cut off, the output impedance of the transistor increases and the potential drop between the emitter electrode 37 and the collector electrode 40 increases. Since the transistor 30, the potentiometer 73 and the resistor 75 are in series across the supply source, a change in impedance of the transistor 30 is effective to change the potential appearing at the wiper 74 of the potentiometer 73. Thus it can be seen that as the current limit is reached and transistor 30 becomes less conductive, the potential at wiper 74 is made less positive. This potential change is in a direction to tend to increase the potential across Zener diode 77 allowing a larger current through the Zener diode, and cause the control transistor 27 to become conductive and subsequently causing the switching transistor 26 to be cut off. By varying the set point of wiper 84 of current setpoint potentiometer 83, the bias point of the transistor 37 can be controlled, and this set point determines the value at which current limiting in the regulator will take place.

The resistor 56, the junction diode 96 and the resistor 97 which are series connected, and which elements are in parallel with the large current carrying diode rectifier 23, are effective to provide compensation in the voltage regulator for the potential drop across the diode rectifier 23. It can be seen that due to the forward voltage drop across the diode 23, a parallel current path can be traced to the resistor 56, the junction 57, the conductor 95, the diode 96, and the resistor 97. As the generator current flowing through the diode rectifier 23 increases, the potential drop across the diode 23 will increase and the current flowing through the parallel path, above described, will also increase. It will be noted that the resistor 56 is in the emitter circuit of the transistor 27 so that as the potential across the resistor 56 is varied, the control point at which switching will take place in the control transistor 27 will be changed, or in other words, the generator terminal voltage will increase to a greater magnitude before voltage regulating will occur.

FIGURE 2

The voltage regulator circuit of FIGURE 2 is in most respects similar to the circuit of FIGURE 1, and the corresponding components which appear in both figures have been given the same identifying numerals in FIGURE 2. In FIGURE 2, the current sensing resistor 21 which was shown in FIGURE 1, is not shown, and the voltage developed across the large current carrying rectifier diode 23 is used as a measure of the generator current. In FIGURE 2, the emitter electrode 34 of the transistor 27 is connected to the conductor 20 by conductor 60, the junction 57, and the resistor 56. The junction 57 is directly connected to the base electrode 41 of the transistor 30 by a conductor 100. A potentiometer resistor 101 is connected between the emitter electrode 37 of the transistor 30 and the junction 72 on conductor 20. The potentiometer resistor 101 also includes a wiper contact 102 which is connected by the junction diode 96 to the junction 94 on the conductor 24. The collector electrode 40 of the transistor 30 is connected by a conductor 103, a junction 104, and a resistor 105 to the junction 76 on conductor 15. The collector electrode 40 by means of the conductor 103, the junction 104, a resistor 106, and the junction 64 is connected to the base electrode 36 of the transistor 27. A junction 107 on the conductor 20 is connected by means of a conductor 112, a voltage setpoint potentiometer resistor 110, which has an adjustable wiper 111, and through a conductor 113 to a junction 114 on the conductor 15. A Zener diode 115 is connected between the potentiometer wiper 111 of potentiometer 110 and to the junction 104.

In considering the operation of the voltage regulator circuit of FIGURE 2, it will be noted that the switching transistor 26 controls the energization to the generator field winding 11 as is also the case in FIGURE 1. The control transistor 27 is connected in current controlling relation to the switching transistor 26 so that when the control transistor 27 becomes conductive, the switching transistor is cut off thereby reducing the generator excitation. The function of the transistor 30 is in providing current limiting for the voltage regulator, and this transistor remains conductive until the current limiting value is reached. The resistor 105 in the base electrode circuit of transistor 27 and in the collector electrode circuit of transistor 30 provides a quiescent conduction current for the control transistor 27. The resistor 53 in the collector circuit of transistor 27 is chosen so that with the above mentioned quiescent current flowing in the transistor 27, the switching transistor 26 will remain conductive.

As the switching transistor 26 remains conductive, the exciting current flowing in the field winding 11 causes the generator terminal voltage to rise rapidly, and as the terminal voltage reaches the regulating value, the transistor 26 is caused to cut off. The voltage magnitude at which the regulator will operate is determined by the setting of the wiper 111 on the voltage calibration potentiometer 110. At the desired regulating voltage, the potential between the junction 104 and the potentiometer wiper 111 is sufficient to exceed the Zener point of the Zener diode 115 whereup on the diode becomes conductive and presents a very low impedance in the circuit. Upon diode 115 becoming conductive, a base current path is present for the transistor 27 which can be traced from the base electrode 36 through the resistor 106, the junction 104, the Zener diode 115, the lower portion of potentiometer 110, and through conductor 113 to the conductor 15 at junction 114. An increase in the conduction of the transistor 27 results, tending to reduce the current flow of the switching transistor 26. As the conductor of transistor 26 is reduced the potential at the junction 45 in the collector circuit of transistor 26 is changed and a regenerative feedback potential appears through the resistor 67 to the base electrode 36 of transistor 27, which feedback potential is in a direction to increase the current flow of transistor 27, which further reduces the conduction of transistor 26. The generator terminal voltage now drops, Zener diode 115 conducts slightly less, the conduction of control transistor 27 is reduced, switching transistor 26 again begins to become conductive. The regenerative feedback from the collector circuit of transistor 26 completes the switching process. This oscillatory type action is rapid and continuous.

The function of the transistor 30, as was stated above, is to provide current regulation. As the current flowing through the junction diode rectifier 23 increases, the potential existing across the terminals of the rectifier also increases. A parallel circuit around the diode 23 can be traced from the junction 72 through the upper portion of the current calibration potentiometer 101 to the wiper 102 and through the junction diode 96 to the junction 94 on the conductor 24. It can be seen that as the potential drop across the rectifier 23 increases the current flowing through the parallel path will likewise increase. The resulting increase in potential drop across the portion of potentiometer 101 affects the input bias of the transistor 30 in a direction tending to cut off the conduction of transistor 30. Adjustment of the wiper 102 on the potentiometer 101 controls the point at which current regulation is made. As the current regulating point is reached and transistor 30 tends to become less conductive, the curent flowing through the resistor 105, due to the collector current of the transistor 30, is reduced thereby affecting the bias of the transistor 27 in a direction to increase the current flow of that transistor. The increase of current flow in transistor 27 is effective, as was previously described, to cause the switching transistor 26 to be cut off. The transistor 30, as shown in FIGURE 2 is also effective to provide temperature stability for the circuit as it provides temperature compensation for the transistor 27.

FIGURE 3

The circuit of FIGURE 3 is basically similar to the voltage regulator circuits above discussed, and this circuit may be useful where the temperature extremes under which the apparatus must operate are not as severe as would require the more complicated circuit of FIGURES 1 or 2. It will be noted that in this circuit only two transistors need be used, the switching transistor 26 and the control transistor 27. Much of the circuit is similar to that shown in FIGURES 1 and 2, and the same identifying numerals are used as in the above figures where the numerals are applicable. The discussion immediately following will be limited to the circuit elements shown in this figure which have not been discussed in the prior figures.

A voltage divider path may be traced from a junction 120 on the conductor 22 and through a conductor 121, a resistor 122, a junction 123, a resistor 124, and a conductor 125, to a junction 126 on the conductor 15. The emitter electrode 31 of transistor 26 is connected by a conductor 127 to the junction 123 of the voltage divider. The resistor 122 is effective to provide a small reverse bias to the switching transistor 26 and operates to perform substantially the same function as the diode 43 of FIGURES 1 and 2. The collector electrode and base electrode circuits of transistor 26 are connected as explained in FIGURE 1. A further voltage divider exists from the junction 107a on the conductor 20 and through the conductor 112, the voltage setpoint potentiometer resistor 110, and the conductor 113 to the junction 114 on the conductor 15. The wiper 111 of the potentiometer 110 is connected to the base electrode 36 of the transistor 27 by the Zener junction diode 115 in the same manner as was described in FIGURE 2. A circuit which parallels the diode rectifier 23 can be traced from a junction 135 on the conductor 22 through a current setpoint potentiometer resistor 132 and a junction diode 134 to the junction 94 on the conductor 24. The potentiometer 132 has a movable wiper contact 133 which is connected by a junstion diode 131 and a conductor 130 to the base electrode circuit of transistor 27 at the junction 66.

In considering the operation of the circuit of FIGURE 3, let it be assumed that the generator terminal voltage is below the regulating point. Under these conditions the switching transistor 26 is conductive and a current path can be traced from the positive generator terminal 12, the conductor 20, the resistor 21, the junction 120, the conductor 121, the resistor 122, the junction 123, the conductor 127, through the transistor 26 from emitter to collector, through the conductors 44 and 46 and through the field winding 11 to the negative generator terminal. With the field winding energized the terminal voltage of the generator rises rapidly and the potential existing across the Zener diode 115 becomes sufficient so that the diode conducts in the Zener or reverse direction. A base current path for the control transistor 27 can then be traced from the emitter electrode 34 to the base electrode 36, the junction 64, the Zener diode 115, the potentiometer wiper 111, through the lower portion of the voltage setpoint potentiometer 110 and through a conductor 113 to the junction 114 on the negative conductor 15. The increase in conduction of the transistor 27 is effective, as has been previously described, to cut off the switching transistor 26 thereby reducing the excitation to the generator. The terminal voltage at which the generator will be regulated can be adjusted by adjusting the potentiometer wiper 111.

Current regulation in this apparatus is achieved by sampling the voltage appearing across the diode rectifier 23. The voltage drop appearing across the potentiometer winding 132 is a measure of the generator current to the load. A portion of the voltage appearing across the current setpoint potentiometer 132, as selected by the setting of the wiper 133, is applied as a bias potential between the emitter electrode 34 and the base electrode 36 of the control transistor 27. It can be seen therefore that at a predetermined value of generator current the potential developed across the potentiometer 132 will be sufficient to cause the control transistor 27 to conduct thereby causing transistor 26 to be cut off and reduce the excitation to the generator.

Under conditions of high temperature operation, it may be desirable to provide a bias circuit, of the type disclosed in FIGURE 1, from the positive battery terminal to the base electrode 36 of transistor 27 in the circuits of FIGURES 2 and 3. This circuit, which may be necessary to insure a proper initial condition of operation of the switching circuit, can be traced in FIGURE 1 from positive terminal 25 through resistor 92, diode 91, and conductors 90 and 65 to the base electrode 36.

In general, while we have shown certain specific embodiments of our invention, it is to be understood that this is for the purpose of illustration and that our invention is to be limited solely by the scope of the appended claims.

We claim:

1. Electrical regulating apparatus, comprising: a generator having a field winding and first and second output terminals; circuit means connecting said output terminals to load means; bistable transistor switching means comprising a first and a second transistor, each of said transistors having a plurality of electrodes including a collector, an emitter, and a control electrode, the collector and emitter electrodes of said first transistor comprising the switching terminals of said transistor switching means; diode means connecting the emitter of said first transistor to said first generator output terminal; means connecting said field winding intermediate the collector electrode of said first transistor and said second generator output terminal; means directly connecting the control electrode of said first transistor to the collector electrode of said second transistor; regenerative impedance feedback means connected between the collector electrode of said first transistor and the control electrode of said second tranisstor; means connecting the emitter of said second transistor to said first generator output terminal; potential sensing means, said sensing means being connected in the control electrode circuit of said second transistor, said sensing means being effective to provide a signal to said second transistor upon the generated potential reaching a predetermined magnitude; current sensing means connected to said circuit means; and means connecting said current sensing means to the control electrode of said second transistor, said current sensing means being effective to provide a signal to said second transistor when the sensed current reaches a predetermined value.

2. Electrical regulating apparatus comprising: a generator having a field winding and first and second output terminals; connection means connecting said output terminals to load means; transistor switching means, said switching means having a pair of switching terminals and a signal terminal, said switching means having two operating conditions and being operable from the first to the second of said conditions in response to a signal, said switching means comprising a first and a second transistor, each of said transistors having a plurality of electrodes including a collector, an emitter, and a control electrode; means connecting the emitter and collector of said first transistor to said transistor switching means switching terminals; impedance means connecting the first of said switching terminals to said first generator output terminal; means connecting said field winding intermediate the second switching terminal of said transistor switching means and said second generator output terminal; means directly connecting the control electrode of said first transistor to one of the emitter and collector electrodes of said second transistor; regenerative impedance feedback means connected between the collector electrode of said first transistor and the control electrode of said second transistor, the control electrode of said second transistor comprising said switching means control terminal; means connecting the other one of said emitter and collector electrodes of said second transistor to said first generator output terminal; potential responsive means, said potential responsive means being connected in the control electrode circuit of said second transistor and to said connection means, said potential responsive means being effective to produce a signal to said second transistor upon the generator potential reaching a predetermined magnitude; current sensing means connected to said connection means; current responsive means comprising a third transistor connected to said current sensing means and being effective to provide an output signal upon said sensed current reaching a predetermined magnitude; and means connecting said current responsive means to the control electrode of said second transistor.

3. Electrical regulating apparatus, comprising: a generator having a field winding and first and second output terminals; circuit means connecting said output terminals to battery means, for recharging said battery means; bistable transistor switching means comprising a first and a second transistor, each of said transistors having a plurality of electrodes including a collector, an emitter, and a control electrode, the collector and emitter electrodes of said first transistor comprising the switching terminals of said transistor switching means; impedance means connecting a first of said switching terminals to said first generator output terminal; means connecting said field winding intermediate the second of said switching terminals and said second generator output terminal; means directly connecting the control electrode of said first transistor to the collector electrode of said second transistor; regenerative impedance feedback means connected between the collector electrode of said first transistor and the control electrode of said second transistor; means connecting the emitter of said second transistor to said first generator output terminal; potential sensing means, said sensing means being connected in the control electrode circuit of said second transistor, said sensing means being effective to provide a signal to said second transistor upon the generated potential reaching a predetermined magnitude; current sensing means connected to said circuit means; means connecting said current sensing means to the control electrode of said second transistor, said current sensing means being effective to provide a signal to said second transistor when the sensed current reaches a predetermined value; and further current conductive means connected intermediate said battery means and the control electrode of said second transistor.

4. Electrical regulating apparatus comprising: a source of electrical power having first and second terminals; control means for said source; connection means connecting said source terminals to battery means, for recharging said battery means, said connection means, including rectifying means; transistor switching means, said switching means having a pair of switching terminals and a signal terminal, said switching means having two operating conditions and being operable from the first to the second of said conditions in response to a signal, said switching means comprising a first and a second transistor, each of said transistors having a plurality of electrodes including a collector, an emitter, and a control electrode; means connecting the emitter and collector of said first transistor to said transistor switching means switching terminals; impedance means connecting the first of said switching terminals to said first power source terminal; means connecting said control means intermediate the second switching terminal of said transistor switching means and said second source terminal; means directly connecting the control electrode of said first transistor to the collector electrode of said second transistor; regenerative impedance feedback means connected between the collector electrode of said first transistor and the control electrode of said second transistor; means connecting the emitter of said second transistor to said first source terminal; potential responsive means, said potential responsive means being connected in the control electrode circuit of said second transistor and to said connection means, said potential responsive means being effective to produce a signal to said second transistor upon the source potential reaching a predetermined magnitude; current sensing means connected to said connection means; current responsive means comprising a third transistor connected to said current sensing means and being effective to provide an output signal upon said sensed current reaching a predetermined magnitude; means connecting said current responsive means to the control electrode of said second transistor; and further current conductive means connected intermediate said battery means and said control electrode of said second transistor.

5. A voltage and current regulating system comprising: rotary generator means adapted to be driven by suitable motor means, said generator means being capable of operating and producing an electrical output over widely varying rotational speeds, said generator means having a pair of output terminals and having excitation means for controlling the electrical output of said generator means; circuit means including rectifying means connecting said generator output terminals to battery means for charging said battery means; semiconductor switching means, said means comprising a plurality of electrodes including switching electrodes and a control electrode, said semiconductor switching means having only two stable conditions of operation and being operable by a suitable signal from one to the other of said conditions, the first operating condition providing a relatively low impedance at said switching electrodes and the second operating condition providing a relatively high impedance at said switching electrodes; means connecting said switching electrodes of said semiconductor switching means in circuit with said generator excitation means in controlling relation thereto; voltage responsive means connected to said generator output terminals for providing an output signal in response to sensing a potential of a predetermined magnitude; current responsive means responsive to a predetermined magnitude of generator output current to produce an output signal; means connecting said voltage responsive means and said current responsive means to the control electrode of said semiconductor switching means, so that when either the voltage or current responsive means provides an output signal the semiconductor switching means is operated to vary the energization to said generator excitation means; bias means including asymmetric current conducting means conneced from said battery means to the control electrode of said semiconductor switching means to provide a bias on said switching means to insure proper initial starting condition of said switching means.

6. Regulating apparatus comprising: electrical generator means, said means having a pair of output terminals and having excitation means for controlling the electrical output of said generator means; battery means; circuit means connecting said generator output terminals to said battery means for charging said battery means; semiconductor switching means, said means comprising a plurality of electrodes including switching electrodes and a control electrode, said switching means having only two conditions of operation, and being operable by a suitable signal from one to the other of said conditions, the first operating condition providing a relatively low impedance at said switching electrodes and the second operating condition providing a relatively high impedance at said switching electrodes; means connecting said switching electrodes of said semiconductor switching means in circuit with said generator excitation means in controlling relation thereto; voltage responsive means connected to said generator output terminals for providing an output signal in response to sensing a potential of a predetermined magnitude; current responsive means responsive to a predetermined magnitude of generator output current to produce an output signal; and means connecting said voltage responsive means and said current responsive means to the control electrode of said semiconductor switching means, so that when either the voltage or current responsive means provides an output signal the semiconductor switching means is operated to vary the energization to said generator excitation means; and bias means including asymmertic current conducting means connected from said battery means to the control electrode of said semiconductor switching means to provide an initial bais on said switching means to insure proper initial starting condition of said switching means.

7. Regulator apparatus comprising: electrical generator means having output terminals and having excitation means adapted to be energized, the energization of which is effective to control the electrical output of said generator means; voltage responsive control means having an output circuit and an input circuit, the input circuit being connected across said generator output terminals, said means comprising a voltage divider network including resistive means and a normally conductive semiconductor current controlling device connected in said input circuit, and voltage reference means connected to an intermediate point on said voltage divider network and connected to said output circuit; semiconductor switching means operable to one or the other of two stable conditions, said switching means having output terminals and a control terminal; means connecting the output terminals of said semiconductor switching means in current controlling relation to said excitation means; means connecting the output circuit of said voltage responsive control means to said control terminal so that upon the magnitude of the generated voltage reaching a predetermined relation with respect to the voltage reference means a signal from said voltage responsive control means switches said semiconductor switching means from one to the other of said operating conditions to vary the generator excitation; circuit means including current sensing means connecting said generator output terminals to a load circuit; and means directly connecting said current sensing means to said semiconductor current controlling device in controlling relation thereto so that upon the output current reaching a predetermined value said semiconductor current controlling device is caused to become less conductive whereby the voltage responsive control means provides a signal to cause said semiconductor switching means to operate from said one operating condition to the other to vary the generator excitation.

8. Regulator apparatus comprising: electrical generator means having output terminals and having excitation means the energization of which is effective to control the electrical output of said generator means; voltage divider means connected across said generator output terminals comprising in series resistive means and a semiconductor current controlling device; voltage responsive reference means; semiconductor switching means operable to one or the other of a conductive or a nonconductive condition, said switching means having output terminals and a control terminal; means connecting the output terminals of said switching means in current controlling relation to said excitation means; said voltage reference means being connected to an intermediate point on said voltage divider means and to the control terminal of said semiconductor switching means in controlling relation thereto so that upon the generated output voltage reaching a predetermined relation with respect to the voltage reference means said semiconductor switching means is switched from one to the other of said operating conditions to vary the generator excitation; circuit means including current sensing means connecting said generator output terminal to a load circuit; and means connecitng said current sensing means to said semiconductor current controlling device in controlling relation thereto so that upon the output current reaching a predetermined value said semiconductor current controlling device is caused to become less conductive whereby the potential at said reference point is shifted to cause said semiconductor switching means to operate from said one operating condition to the other to vary the generator excitation.

9. Regulator apparatus comprising: electrical generator means having output terminals and having excitation means the energization of which is effective to control the electrical output of said generator means; voltage divider means connected across said generator output terminals comprising in series resistive means having a tap point and a normally conductive transistor; voltage reference means; semiconductor switching means operable to one or the other of two stable conditions, said switching means having output terminals and a control terminal; means connecting the output terminals of said switching means in current controlling relation to said excitation means; said voltage reference means being connected to said tap point on said voltage divider means and to the control terminal of said semiconductor switching means in controlling relation thereto so that upon the voltage at said tap point reaching a predetermined relation with respect to the voltage reference means a signal is applied to said control terminal so that said semiconductor switching means is switched from one to the other of said operating conditions to vary the generator excitation; circuit means including current sensing means connecting said generator output terminals to a load circuit; said current sensing means being connected to said transistor control circuit in controlling relation thereto so that upon the output current reaching a predetermined value said normally conductive transistor is caused to become less conductive to vary the characteristics of said voltage divider means whereby the potential at said tap point is shifted to apply a signal to said switching means control terminal to cause said semiconductor switching means to operate from said one operating condition to the other to vary the generator excitation.

10. An arrangement for regulating the charging of a storage battery comprising a direct current generator having a field winding, positive and negative leads extending from the output terminals of said generator to said battery, a circuit connected between said positive and negative leads, a point on said circuit being voltage sensitive to a change in potential between said leads; a first transistor having emitter, base and collector electrodes, the emitter electrode being connected to one of said leads, the base electrode being coupled to said voltage sensitive point whereby said base acquires a potential dependent upon said change of potential between said leads, the collector electrode being connected to the other of said leads through a resistor; a second transistor having emitter, base and collector electrodes, the base electrode of the second transistor being connected to the collector electrode of the first transistor, the collector of the second transistor being connected to one end of said field winding, the other end of the field winding being connected to the other of said leads and a semiconductor diode connected between the emitter of the second transistor and said one of said leads, said diode being conductive solely in its forward direction.

11. In an electrical system, the combination comprising, a direct current generator having an output circuit and an energizable field, leads connectible to said output circuit, a transistor having a base, emitter and collector electrodes, said emitter and collector being connected in series with said field across said leads, a diode having a relatively constant forward voltage drop thereacross, and means including said diode connected with said emitter, base, and said leads to vary current flow through said base in response to current flow in and voltage across said leads, said diode having a voltage drop thereacross being effective to decrease the voltage necessary at said base electrode to bring said transistor to complete cutoff.

12. In an electrical system, the combination comprising, a generator having an output circuit and an energizable field, leads connectible to said output circuit, first and second transistors each having base, emitter and collector electrodes, said first transistor emitter being connected to a first of said leads and said collector being connected through a resistor to the other of said leads, said second transistor base electrode being directly connected to said first transistor collector, said second transistor emitter and collector being connected in series with said field across said leads, a diode, said diode being connected with said emitter and said first lead, said diode having a voltage drop thereacross effective to decrease the voltage necessary at said base electrode to bring said second transistor to complete cutoff, and means connected with said first transistor base and said leads to vary current flow through said base in response to voltage across said leads.

13. A control circuit for a power source having a control winding that varies the output voltage of said source in response to current flow therethrough comprising, a D.C. output circuit connected with said power source, a transistor, a circuit element having a substantially constant voltage drop thereacross with varying current flow therethrough, means connecting said transistor, control winding and circuit element in series circuit relationship and across said D.C. output circuit, a voltage sensing circuit connected in circuit with said D.C. output circuit, means connected with said sensing circuit and with said transistor for controlling the conduction of the transistor in response to voltage change across said D.C. output circuit, and means for at times connecting said circuit element across the base and emitter of said transistor in such a direction that the voltage appearing across said circuit element opposes current flow from emitter to base in said transistor to substantially fully cut off conduction of said transistor.

14. A control circuit for a power source having a control winding that varies the output voltage of said source in response to current flow therethrough comprising, a D.C. output circuit connected with said power source, a first transistor having a base, emitter and collector, a diode having a substantially constant voltage drop thereacross with varying current flow therethrough, means connecting said transistor, control winding and diode in series circuit relationship and across said D.C. output circuit, a second transistor having a base, emitter and collector, means connecting the base of said first transistor with the collector of said second transistor, means connected with said D.C. output circuit and with the base electrode of said second transistor for controlling the conduction of said second transistor as a function of the voltage appearing across said output circuit, and means including the emitter-collector circuit of said second transistor for at times connecting said diode across the base and emitter of said first transistor in such a direction that the voltage appearing across said diode opposes current flow in the emitter-base circuit of said first transistor.

References Cited

UNITED STATES PATENTS

| | | | |
|---|---|---|---|
| 1,147,005 | 7/1915 | Creveling | 320—32 |
| 2,740,086 | 3/1956 | Evans et al. | 322—28 |
| 2,759,142 | 8/1956 | Hamilton | 323—66 |
| 2,776,382 | 1/1957 | Jensen | 323—22 |
| 2,809,301 | 10/1957 | Short | 322—25 X |
| 2,809,303 | 10/1957 | Collins | 307—88 |
| 2,862,175 | 11/1958 | Guyton et al. | 322—28 |

FOREIGN PATENTS

| | | |
|---|---|---|
| 332,009 | 7/1930 | Great Britain. |
| 422,604 | 1/1935 | Great Britain. |

JOHN F. COUCH, *Primary Examiner.*

MILTON O. HIRSHFIELD, ORIS L. RADER,
*Examiners.*

R. J. CRAWFORD, S. WEINBERG,
*Assistant Examiners.*